United States Patent
Kasahara

(10) Patent No.: US 11,086,309 B2
(45) Date of Patent: Aug. 10, 2021

(54) APPARATUS, CONTROL METHOD OF APPARATUS AND CONTROL METHOD OF MANAGEMENT APPARATUS

(71) Applicant: CANON KABUSHIKI KAISHA, Tokyo (JP)

(72) Inventor: Aya Kasahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 16/691,693

(22) Filed: Nov. 22, 2019

(65) Prior Publication Data

US 2020/0192343 A1   Jun. 18, 2020

(30) Foreign Application Priority Data

Dec. 12, 2018   (JP) .............................. JP2018-232660

(51) Int. Cl.
   *G05B 23/02*   (2006.01)
(52) U.S. Cl.
   CPC ....... *G05B 23/0254* (2013.01); *G05B 23/027* (2013.01); *G05B 23/0264* (2013.01); *G05B 23/0272* (2013.01)

(58) Field of Classification Search
   None
   See application file for complete search history.

(56) References Cited

U.S. PATENT DOCUMENTS

2008/0288210 A1   11/2008   Imahara

FOREIGN PATENT DOCUMENTS

JP   2008287495 A   11/2008

*Primary Examiner* — Carlos R Ortiz Rodriguez
(74) *Attorney, Agent, or Firm* — Rossi, Kimms & McDowell LLP

(57) ABSTRACT

An apparatus capable of attaching a maintenance part that needs replacement accompanying use, the apparatus including: a storage unit configured to store at least one or more patterns of a prediction equation of a life of the maintenance part in a storage device; a prediction unit configured to predict a life of the maintenance part by applying one of prediction equations stored in the storage unit; and a transmission unit configured to transmit predetermined information relating to the maintenance part to a management apparatus that manages information relating to a life of the maintenance part, and the transmission unit includes identification information on a prediction equation currently being applied to a prediction of a life of the maintenance part in the predetermined information that is transmitted to the management apparatus.

20 Claims, 12 Drawing Sheets

< MAINTENANCE PART MANAGEMENT DATABASE >

MFP100    1201    1202    1203    1200

| PART No | COUNT VALUE | LIMIT COUNT VALUE | NUMBER OF REMAINING DAYS (DAY) | PREDICTION EQUATION ID DERIVING NUMBER OF REMAINING DAYS |
|---------|-------------|-------------------|-------------------------------|----------------------------------------------------------|
| 0000001 | 600000      | 600000            | 0                             | 1                                                        |
| 0000002 | 582000      | 600000            | 5                             | 1                                                        |
| 0000003 | 456000      | 600000            | 41                            | 1                                                        |
| 0000004 | 384000      | 600000            | 59                            | 1                                                        |
| 0000005 | 70000       | 700000            | 371                           | 1                                                        |
| 0000006 | 782000      | 850000            | 13                            | 1                                                        |
| 0000007 | 450500      | 850000            | 86                            | 1                                                        |
| 0000008 | 646000      | 850000            | 41                            | 1                                                        |
| 0000009 | 544000      | 850000            | 59                            | 1                                                        |
| 0000010 | 18000       | 900000            | 432                           | 1                                                        |
| 0000011 | 819000      | 700000            | 0                             | 1                                                        |

1204   CLOSE

| 301 | 302 | 303 | 304 | 305 | 306 | 307 | 308 | 309 | 310 |
|---|---|---|---|---|---|---|---|---|---|
| MAINTENANCE PART | MODEL NUMBER | MAINTENANCE PART ID | PREDICTION EQUATION ID CURRENTLY BEING APPLIED | DEGREE OF USE (%) | NUMBER OF REMAINING DAYS (DAY) | COUNT VALUE | LIMIT COUNT VALUE | PREDICTION EQUATION ID RESERVED | THRESHOLD VALUE REACH ALARM SETTING |
| BLACK TONER CONTAINER | NTG-YYY | TONER-K | LGC_1_TONER-K | 100 | 0 | 600000 | 600000 | – | 5 |
| YELLOW TONER CONTAINER | NTG-YYY | TONER-Y | LGC_1_TONER-Y | 97 | 5 | 582000 | 600000 | – | 5 |
| MAGENTA TONER CONTAINER | NTG-YYY | TONER-M | LGC_1_TONER-M | 76 | 41 | 456000 | 600000 | – | 5 |
| CYAN TONER CONTAINER | NTG-YYY | TONER-C | LGC_1_TONER-C | 64 | 59 | 384000 | 600000 | – | 5 |
| COLLECTED TONER CONTAINER | WT-XXX | WST-TNR | LGC_1_WST-TNR | 10 | 371 | 70000 | 600000 | LGC_3_WST-TNR | 7 |
| BLACK PHOTOCONDUCTOR DRUM | NPG-ZZZ | PT-DRM | LGC_1_PT-DRM | 92 | 13 | 782000 | 850000 | LGC_2_PT-DRM | 7 |
| YELLOW PHOTOCONDUCTOR DRUM | NPG-ZZZ | PT-DR-Y | LGC_1_PT-DR-Y | 53 | 86 | 450500 | 850000 | LGC_2_PT-DR-Y | 7 |
| MAGENTA PHOTOCONDUCTOR DRUM | NPG-ZZZ | PT-DR-M | LGC_1_PT-DR-M | 76 | 41 | 646000 | 850000 | LGC_2_PT-DR-M | 7 |
| CYAN PHOTOCONDUCTOR DRUM | NPG-ZZZ | PT-DR-C | LGC_1_PT-DR-C | 64 | 59 | 544000 | 850000 | LGC_2_PT-DR-C | 7 |
| FIXING UNIT | FX-XXX | FX-UNIT | LGC_1_FX-UNIT | 2 | 432 | 18000 | 900000 | – | 7 |
| DOCUMENT FEED ROLLER | DR-XXX | DF-PU-RL | LGC_1_DF-PU-RL | 12 | 0 | 819000 | 700000 | – | 7 |

| ALARM TYPE | OCCURRENCE OF TRIGGER | DATA ITEM | UNIT |
|---|---|---|---|
| THRESHOLD VALUE REACH ALARM | TIMING AT WHICH NUMBER OF REMAINING DAYS REACHES THRESHOLD VALUE | ALARM CODE | NUMBER (801) |
| | | DEGREE OF USE | % (802) |
| | | NUMBER OF REMAINING DAYS | DAY (803) |
| | | PREDICTION EQUATION ID | NUMBER (804) |
| REPLACEMENT COMPLETION ALARM | TIMING AT WHICH REPLACEMENT OF PART IS COMPLETED | ALARM CODE | NUMBER (811) |
| | | DEGREE OF USE | % (812) |
| | | PREDICTION EQUATION ID | NUMBER (813) |

FIG.9

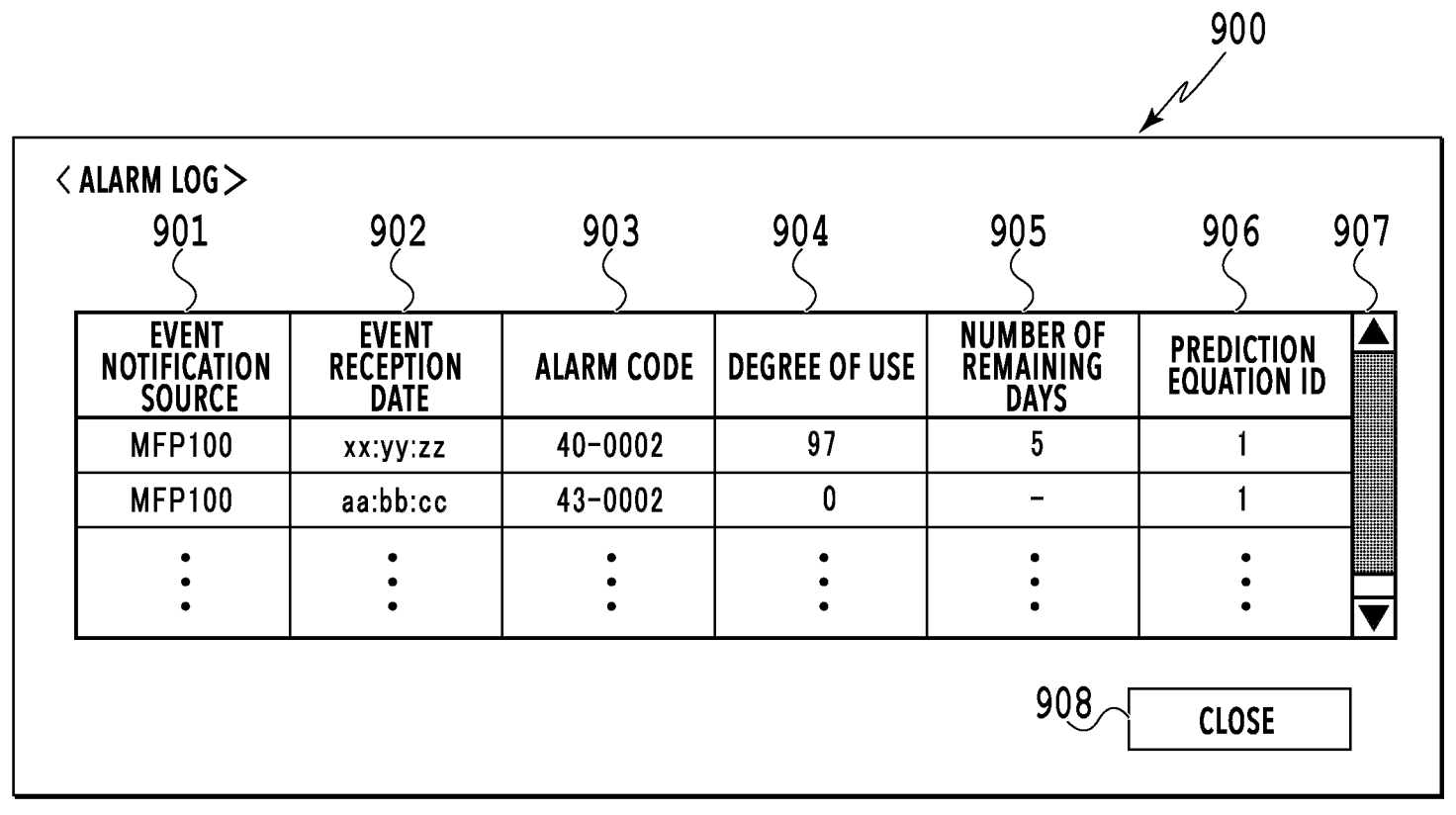

<ALARM LOG>

| EVENT NOTIFICATION SOURCE | EVENT RECEPTION DATE | ALARM CODE | DEGREE OF USE | NUMBER OF REMAINING DAYS | PREDICTION EQUATION ID |
|---|---|---|---|---|---|
| MFP100 | xx:yy:zz | 40-0002 | 97 | 5 | 1 |
| MFP100 | aa:bb:cc | 43-0002 | 0 | – | 1 |
| ... | ... | ... | ... | ... | ... |

CLOSE

‹ MAINTENANCE PART MANAGEMENT DATABASE ›

MFP100 ▶ — 1201

| PART No | COUNT VALUE | LIMIT COUNT VALUE | NUMBER OF REMAINING DAYS (DAY) | PREDICTION EQUATION ID DERIVING NUMBER OF REMAINING DAYS |
|---|---|---|---|---|
| 0000001 | 600000 | 600000 | 0 | 1 |
| 0000002 | 582000 | 600000 | 5 | 1 |
| 0000003 | 456000 | 600000 | 41 | 1 |
| 0000004 | 384000 | 600000 | 59 | 1 |
| 0000005 | 70000 | 700000 | 371 | 1 |
| 0000006 | 782000 | 850000 | 13 | 1 |
| 0000007 | 450500 | 850000 | 86 | 1 |
| 0000008 | 646000 | 850000 | 41 | 1 |
| 0000009 | 544000 | 850000 | 59 | 1 |
| 0000010 | 18000 | 900000 | 432 | 1 |
| 0000011 | 819000 | 700000 | 0 | 1 |

CLOSE — 1204

FIG.12

APPARATUS, CONTROL METHOD OF APPARATUS AND CONTROL METHOD OF MANAGEMENT APPARATUS

BACKGROUND OF THE INVENTION

Field of the Invention

The present invention relates to a technique to predict a life of a maintenance part that needs replacement accompanying the operation of an apparatus, in particular, an image forming apparatus.

Description of the Related Art

An electrophotographic image forming apparatus, such as a printer, a copy machine, and a facsimile, includes maintenance parts, for example, such as a toner container and a collected toner container. For the maintenance part such as this, of course replacement is necessary because of degradation over time and consumption of toner, which is a color material, and in addition, it is necessary to perform replacement at appropriate timing in order to appropriately maintain the print quality in the image forming apparatus.

Consequently, a system is known in which an image forming apparatus predicts a life of a maintenance part and notifies a maintenance part management server (hereinafter, called maintenance server) of the prediction results and the maintenance server manages information relating to the life of the maintenance part in accordance with the prediction results notified by the image forming apparatus (for example, Japanese Patent Laid-open No. 2008-287495). In the system such as this, the maintenance server makes arrangements and so on of delivery of the maintenance part so that the image forming apparatus can operate without trouble by collecting and analyzing the information notified by the image forming apparatus. Further, it is possible for a service engineer to acquire necessary information en bloc on the maintenance parts attached to each image forming apparatus connected to the maintenance server by accessing the maintenance server.

SUMMARY OF THE INVENTION

The present invention has been made in view of the above-described circumstances and provides a technique to make it possible to easily specify a prediction equation that is used for the prediction of a life of a maintenance part in a system managing a maintenance part that needs replacement accompanying the operation of an image forming apparatus.

The apparatus according to one aspect of the present invention is an apparatus capable of attaching a maintenance part that needs replacement accompanying use, the apparatus including: a storage unit configured to store at least one or more patterns of a prediction equation for predicting a life of the maintenance part in a storage device; a prediction unit configured to predict a life of the maintenance part by applying one of prediction equations stored in the storage unit; and a transmission unit configured to transmit predetermined information relating to the maintenance part to a management apparatus that manages information relating to a life of the maintenance part, and the transmission unit includes identification information on a prediction equation currently being applied to a prediction of a life of the maintenance part in the predetermined information that is transmitted to the management apparatus.

Further features of the present invention will become apparent from the following description of exemplary embodiments with reference to the attached drawings.

BRIEF DESCRIPTION OF THE DRAWINGS

FIG. 3 is a diagram showing an example of a maintenance part life management table;

FIG. 8 is a diagram for explaining data included in each alarm log;

FIG. 9 is a diagram showing an example of a user interface screen for presenting an alarm log;

FIG. 12 is a diagram showing a user interface screen for presenting a maintenance part management database.

DESCRIPTION OF THE EMBODIMENTS

In a case where a life predicted by the image forming apparatus deviates from the actual life, or the like, it is necessary for a service engineer to specify the prediction equation used for the prediction of the life and to take measures, such as to update and modify the prediction equation. Note that, in a case where the maintenance server is not notified of the information relating to the prediction equation applied to each maintenance part, it is not possible for a service engineer to specify the prediction equation applied to the maintenance part, and therefore, it is difficult to take measures as described above. Consequently, in order to appropriately manage a maintenance part, it is necessary to notify the maintenance server of the information relating to the prediction equation.

In the following, aspects for embodying the present invention are explained by using the drawings. Components described in the following embodiments are merely indicating aspects as examples of the present invention and are not intended to limit the scope of the present invention only to those.

First Embodiment

Figure 1:
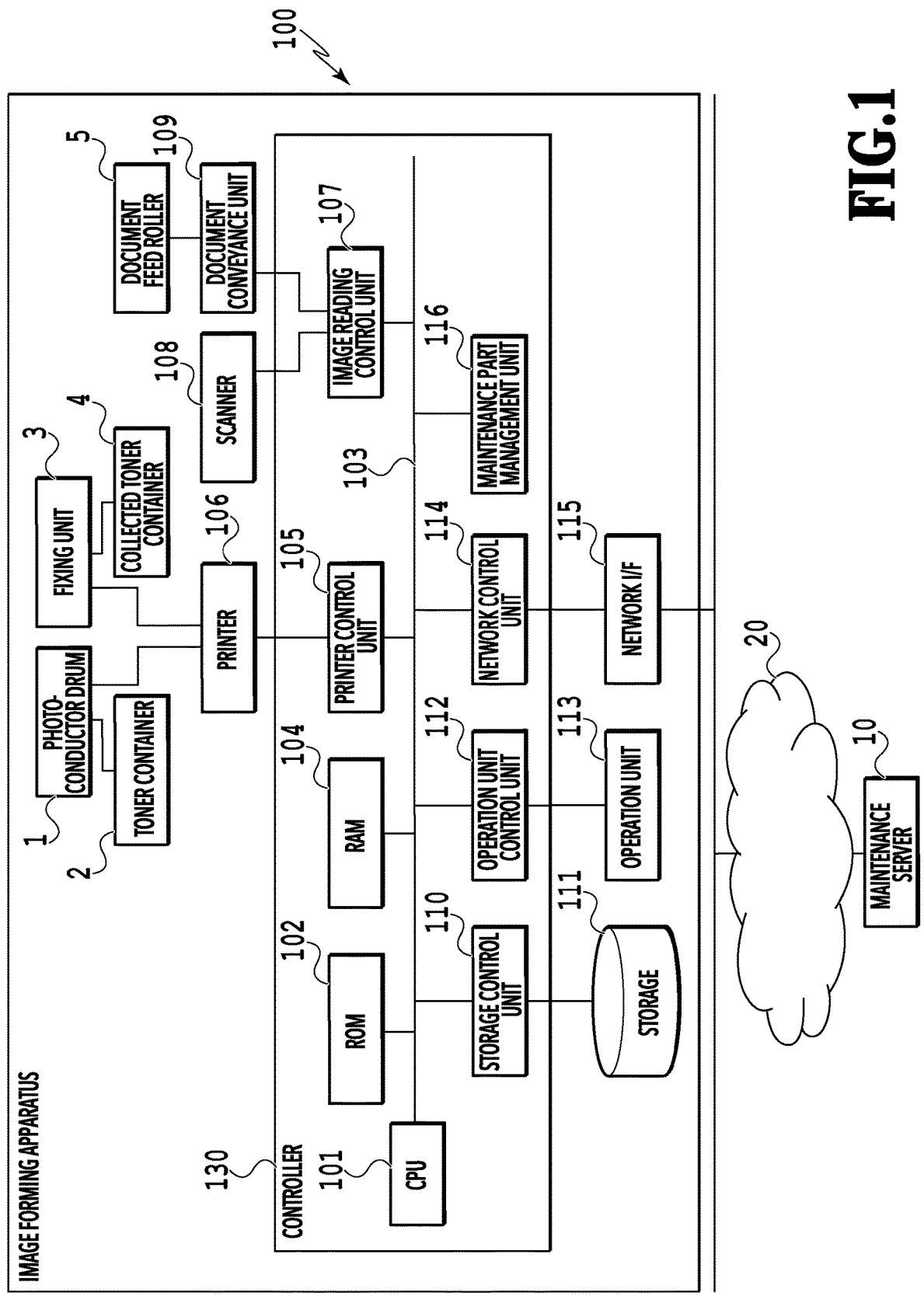
FIG. 1 is a block diagram showing an example of a system including an image forming apparatus in a first embodiment.

FIG. 1 is a block diagram showing an example of a system including an image forming apparatus 100 in a first embodiment. As shown in FIG. 1, the image forming apparatus 100 is connected with a maintenance server (hereinafter, also called management apparatus) 10 existing on an internet 20 so as to be capable of communication. The system shown in FIG. 1 may include an image forming apparatus other than the image forming apparatus 100. That is, a plurality of image forming apparatuses may be connected to the maintenance server 10.

The image forming apparatus 100 includes a controller 130. The controller 130 has a CPU 101, a ROM 102, a RAM 104, a printer control unit 105, an image reading control unit 107, a storage control unit 110, an operation unit control unit 112, a network control unit 114, and a maintenance part management unit 116. Each component possessed by the controller 130 is connected by a bus 103.

Further, the image forming apparatus 100 includes hardware, such as a storage 111, a printer 106, a scanner 108, a document conveyance unit 109, and an operation unit 113. The printer control unit 105, the image reading control unit 107, the storage control unit 110, the operation unit control unit 112, and the network control unit 114 of the controller 130 function as an interface for the CPU 101 to control each piece of hardware.

Further, it is possible for the image forming apparatus 100 to attach a large number of maintenance parts that a service engineer, a user, a person in charge of maintenance (hereinafter, described as a service engineer or the like) and the like can replace. In the following, in a case where the term "user" alone is referred to simply, it is assumed that the term includes not only a user but alto a service engineer, a person in charge of maintenance, and the like. For example, in the printer 106, a photoconductor drum 1, a toner container 2, a fixing unit 3, and a collected toner container 4 are maintenance parts and those maintenance parts are comprised in a configuration detachable from the printer 106. For example, for the toner container 2, in a case where the remaining amount of toner possessed by the toner container 2 becomes a threshold value or less, replacement becomes necessary. On the other hand, for the collected toner container 4, in a case where the amount of toner not used for printing and stored (collected) in the container becomes a threshold value or more, replacement becomes necessary. In the document conveyance unit 109, a document feed roller 5 and the like are maintenance parts and comprised in a configuration detachable from the document conveyance unit 109. In the following, although a case is taken as an example where the printer 106 performs electrophotographic image formation, it may also be possible for the printer 106 to adopt an ink jet method of forming an image by ejecting ink, which is a color material, onto a sheet, such as paper.

The controller 130 including the CPU 101 controls the entire image forming apparatus 100. The CPU 101 boots the OS (Operating System) by a boot program stored in the ROM 102. Then, the CPU 101 executes control programs stored in the storage 111 and the ROM 102 on the OS. The RAM 104 is used as a temporary storage area, such as a main memory and a work area, of the CPU 101. The storage 111 is a readable, writable nonvolatile storage device, such as an HDD (Hard Disk Drive). In the storage 111, a variety of programs and data, such as the control program for controlling the entire image forming apparatus 100, various application programs, image data, and data indicating the degree of use and the number of days of operation of a maintenance part, are stored. The CPU 101 accesses the storage 111 via the storage control unit 110. The CPU 101 controls the image forming apparatus 100 by reading the control program and application programs from the storage 111 or the ROM 102, loading them onto the RAM 104, and executing them. As described above, the hardware, such as the CPU 101, the ROM 102, the RAM 104, and the storage 111, configuring the controller 130 configures a so-called computer.

Further, the CPU 101 reads an image on a document by controlling the scanner 108 via the image reading control unit 107 and generates image data indicating the read image. It is also possible for the CPU 101 to generate image data by controlling the document conveyance unit 109 having an ADF (Auto Document Feeder) to convey documents loaded on the document conveyance unit 109 to the scanner 108 one by one. The scanner 108 performs a scan of a document by using an optical reader, such as a CCD, and converts image information on a document, which is obtained by the scan, into an electric signal (image data). The image data obtained by the scanner 108 is stored in the storage 111. The CPU 101 forms an image on a printing medium (sheet, such as paper) based on image data and the like stored in the storage 111 in cooperation with the printer control unit 105 and the printer 106.

The operation unit control unit 112 connects the operation unit 113 and the controller 130. The operation unit 113 functions as a display unit configured to display information for presentation to a user and a reception unit configured to receive instructions from a user. The operation unit 113 includes a touch panel display that displays an operation screen, to be described later, receives an input from a user, and so on. Further, the operation unit 113 includes hard keys, such as a start key and a situation check/abort key. The situation check/abort key is a key that causes a screen being displayed on the touch panel display to make a transition into a status screen (hereinafter, called situation check/abort screen) for checking the status of the image forming apparatus 100, aborting a job being performed, and so on.

The network control unit 114 is capable of communication with the maintenance server 10 connected to the internet 20 via a network I/F 115. The internet 20 may be configured by a wired LAN or a wireless LAN, or may be configured by another network. The maintenance part management unit 116 manages information relating to the maintenance parts comprised by the image forming apparatus 100. The maintenance part management unit 116 performs control of switching of a prediction equation for predicting a life of a maintenance part, registration of log information (hereinafter, called alarm log) on an alarm relating to a maintenance part, a response to an inquiry about part information from the maintenance server 10, and the like. The processing performed by the maintenance part management unit 116 will be described later by using FIG. 6 and FIG. 10.

Following the above, management of the life of a maintenance part is explained. The life of maintenance parts, such as the toner container, the collected toner container, the photoconductor drum, the fixing unit, and the document feed roller, is managed appropriately. In the present embodiment, the controller 130 (more specifically, the maintenance part management unit 116) of the image forming apparatus 100 manages the degree of use (also called life value) and the number of remaining days indicating the remaining period during which the maintenance part can be used as the life of the maintenance part. In the following, in a case of a representation of "number of remaining days", it is assumed that the remaining time until replacement of the maintenance part becomes necessary, or the like is included, in addition to the number of remaining days until replacement of the maintenance part becomes necessary. Consequently, there is a case where "number of remaining days" is represented as "remaining time".

First, degree of use derivation processing performed by the controller 130 is explained. For example, the degree of use of the toner container is derived based on the record of operation of the maintenance part, such as the number of times of replenishment of toner for each drum cartridge and the remaining amount detection by a sensor. At this time, it may also be possible to take into consideration the dot count obtained by counting the number of colored dots of an image to be printed, and the like, in addition to the record of operation. Further, the degree of use of the collected toner container, the photoconductor drum, the fixing unit, and the document feed roller is derived based on the record of operation, such as the number of sheets passed and the distance traveled.

Following the above, the estimation processing of the number of remaining days performed by the controller 130 is explained. The number of remaining days is estimated based on the degree of use of each maintenance part, the number of days of operation of each maintenance part, and the like. For example, the CPU 101 derives the average amount of use per day of each maintenance part based on the degree of use of each maintenance part, the number of days of operation of each maintenance part, and the like. Then, the CPU 101 estimates the number of remaining days based on the current degree of use and the average amount of use of each maintenance part. The estimation method of the number of remaining days is not limited to this and for example, it is possible to derive an estimated value indicating the number of remaining days by using the multiple regression analysis or the like. Further, for example, it is also possible to estimate an estimated value indicating the number of remaining days by performing a construction (also called training) of a learning model by performing machine learning using the data of various records of operation as input data and by using the constructed learning model. It may also be possible for the image forming apparatus 100 and the maintenance server 10 to perform the construction processing of a learning model and the estimation processing in cooperation with each other. The degree of use of each maintenance part and the number of remaining days of each maintenance part thus obtained are stored in the storage 111.

The prediction equation that is used at the time of deriving the degree of use and the number of remaining days described above is laid out so that the life is derived with a higher accuracy by combining a variety of parameters. Consequently, in a case of pursuing a higher accuracy, it is not necessarily possible to determine one prediction equation that is used for derivation of a life. For example, a case where it is desired to switch the prediction equation to another is considered, such as a case where a prediction equation with a high accuracy is laid out by changing the layout of parameters and a case where a prediction equation for each client, which takes into consideration the installation environment of the image forming apparatus 100 and the use method of a user, is laid out. Further, a case is considered where it is desired to selectively switch a prediction equation in accordance with the use environment, the condition, and the like of a user by preparing a plurality of patterns thereof. An image forming apparatus has been proposed by supposing such a case, which switches a prediction equation to be applied in accordance with instructions from a user by storing in advance two or more patterns thereof. At that time, in a case where a prediction by the multiple regression analysis or the learning model as described previously is performed, on a condition that the prediction equation is switched after the start of use of the maintenance part, there is a possibility that it is no longer possible to derive an accurate life by the prediction equation after the switching. For example, there is a case where the prediction equation that a user desires to use anew uses information that is not used by the prediction equation used so far. In this situation, there is a case where it is not possible to acquire accurate information that is not used so far until the maintenance part in use is replaced. Consequently, in such a case, the image forming apparatus 100 switches the prediction equation at the time of next replacement of the maintenance part. Due to this, it is possible to start learning from the state where the record of operation is reset, and therefore, it is made possible to derive an accurate life by the prediction equation after the switching.

Figure 2:
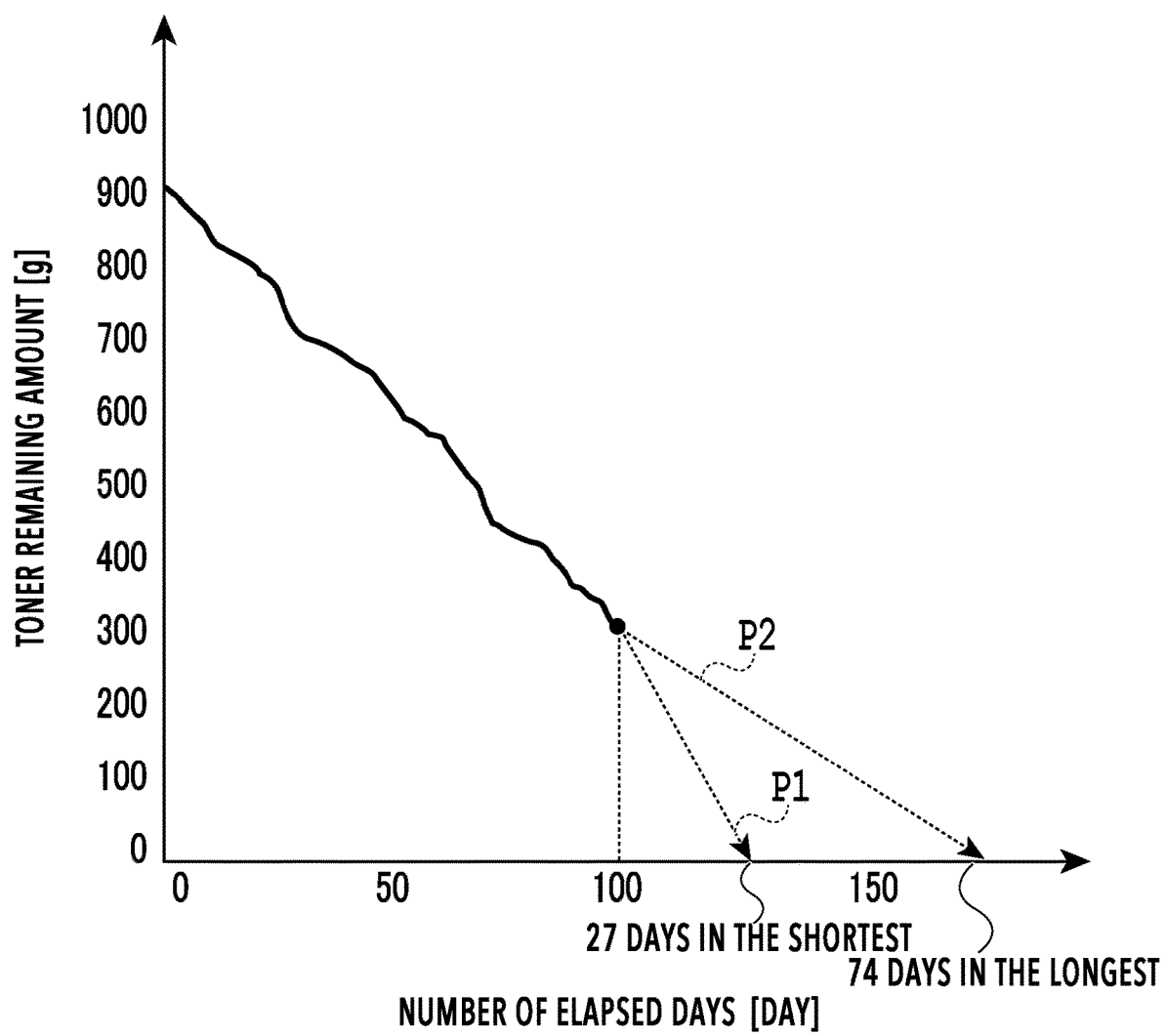
FIG. 2 is a diagram showing an example of a transition of a toner remaining amount within a toner container.

Here, by using FIG. 2, the number of remaining days of a maintenance part is explained. FIG. 2 is a diagram showing an example of a transition of the toner remaining amount within the toner container. FIG. 2 shows the transition of the toner remaining amount obtained by subtracting the amount of use of toner per day from the toner initial amount (toner remaining amount in a case where the number of elapsed days is zero). In FIG. 2, the horizontal axis represents the number of elapsed days from the day of the start of use of the toner container and the vertical axis represents the toner remaining amount included in the toner container. In the example shown in FIG. 2, at the point in time of elapse of 100 days after the start of use of the new toner container, the day the toner container becomes empty (day the toner remaining amount becomes zero) is predicted. More specifically, at the point in time of elapse of 100 days after the start of use of the new toner container, the day the toner remaining amount becomes zero is calculated provisionally from the average amount of use per day derived from the past specified period (here, 30 days). A broken-line arrow P1 shown in FIG. 2 indicates that the toner container becomes empty in 27 days in the shortest (127 days from the start of use) according to the provisional calculation. On the other hand, a broken-line arrow P2 indicates that the toner container becomes empty in 74 days in the longest (174 days from the start of use) according to the provisional calculation. That is, it is predicted that the minimum number of remaining days is 27 and the maximum number of remaining days is 74.

At the beginning of the start of use of new toner, there is a possibility that the accuracy of the value of the average amount of use per day is low. Consequently, the provisional calculation is performed at the point in time of elapse of 100 days in the example shown in FIG. 2. Note that, the day the provisional calculation is performed may be set arbitrarily by a service engineer or the like. For the maintenance part that causes the image forming apparatus 100 to stop in a case where the maintenance part itself runs short, the risk of stop is avoided as much as possible by adopting the minimum number of remaining days. It may also be possible to perform the provisional calculation regularly (for example, every second) or irregularly (for example, each time of image formation in units of printing, such as each time one image is formed and each time one page is formed).

Following the above, by using FIG. 3, management of the prediction equation that is used for derivation of the life of each maintenance part is explained. FIG. 3 is a diagram showing an example of a maintenance part life management table 300 (hereinafter, simply described as management table 300) stored in the ROM 104 or the storage 111. In the management table 300, the value is updated each time the provisional calculation of the number of remaining days is performed. As shown in FIG. 3, the management table 300 is a table storing a maintenance part that a service engineer or the like can replace and information relating to the life of the maintenance part in association with each other. By causing the storage device incorporated in the maintenance part to store the remaining amount of the maintenance part and the number of remaining days calculated provisionally, it is made possible to acquire the remaining amount and the number of remaining days at the time of reattachment of the maintenance part even though the maintenance part is removed from the image forming apparatus 100. In the management table 300, in association with Maintenance part 301, Model number 302, Maintenance part ID 303, Prediction equation ID currently being applied (hereinafter, described as Currently-being-applied prediction equation ID) 304, Degree of use 305, and Number of remaining days 306 are stored. Further, in the management table 300, in association with Maintenance part 301, Count value 307, Limit count value 308, Prediction equation ID reserved (hereinafter, described as Reserved prediction equation ID) 309, and Threshold value reach alarm setting 310 are stored. Maintenance part 301 is information indicating the name of the maintenance part that is attached to the image forming apparatus, such as the toner container of each color, the collected toner container, the photoconductor drum of each color, the fixing unit, and the document feed roller. Model number 302 is identification information for identifying between the maintenance parts attached to different kinds of image forming apparatus, for example, such as a high-speed apparatus and a low-speed apparatus. This identification information is used at the time of ordering the maintenance part. Maintenance part ID 303 is identification information for specifying the maintenance part. Currently-being-applied prediction equation ID 304 is the prediction equation ID of the prediction equation currently being applied for derivation of the life of the maintenance part. The prediction equation ID is identification information capable of uniquely specifying the prediction equation. In the present embodiment, the prediction equation corresponding to each prediction equation ID is stored in the ROM 102 or the storage 111 in the form of program. Degree of use 305 is the degree of use at the current point in time of the maintenance part and updated accompanying the derivation processing described previously. Number of remaining days 306 is the number of remaining days until the end of life of the maintenance part is reached and updated accompanying the estimation processing described previously. Count value 307 is the value obtained by counting the number of times of use of the maintenance part based on a count method determined in advance and is updated each time the maintenance part is used. Limit count value 308 is the limit value of Count value 307 and set in advance. In a case where Count value 307 reaches Limit count value 308, it is determined that the end of life is reached. Reserved prediction equation ID 309 is the prediction equation ID of the prediction equation that is applied at the time of next part replacement. In a case where although a switching setting of a prediction equation is performed by a service engineer or the like, it is not possible to immediately switch to the prediction equation specified by the switching setting, the prediction equation ID of the specified prediction equation is stored as Reserved prediction equation ID 309. Then, at the time of next part replacement, switching to the prediction equation corresponding to Reserved prediction equation ID 309 is performed. The hyphen "–" in FIG. 3 indicates that no prediction equation is reserved for the corresponding maintenance part. Threshold value reach alarm setting 310 is a setting value of an alarm for giving a notification that the number of remaining days of the maintenance part becomes small. The image forming apparatus 100 stores a threshold value reach alarm log in the RAM 104 at timing at which Number of remaining days 306 of the maintenance part reaches the value stored in Threshold value reach alarm setting 310. At this time, the image forming apparatus 100 issues an event giving a notification that a threshold value reach alarm log is stored in the RAM 104. By receiving the event, it is possible for the maintenance server 10 and the like to detect that the number of remaining days of the maintenance part has reached the threshold value. The data structure of the management table 300 is not limited to the table as shown in FIG. 3 and may have a data structure other than that.

Figure 4:
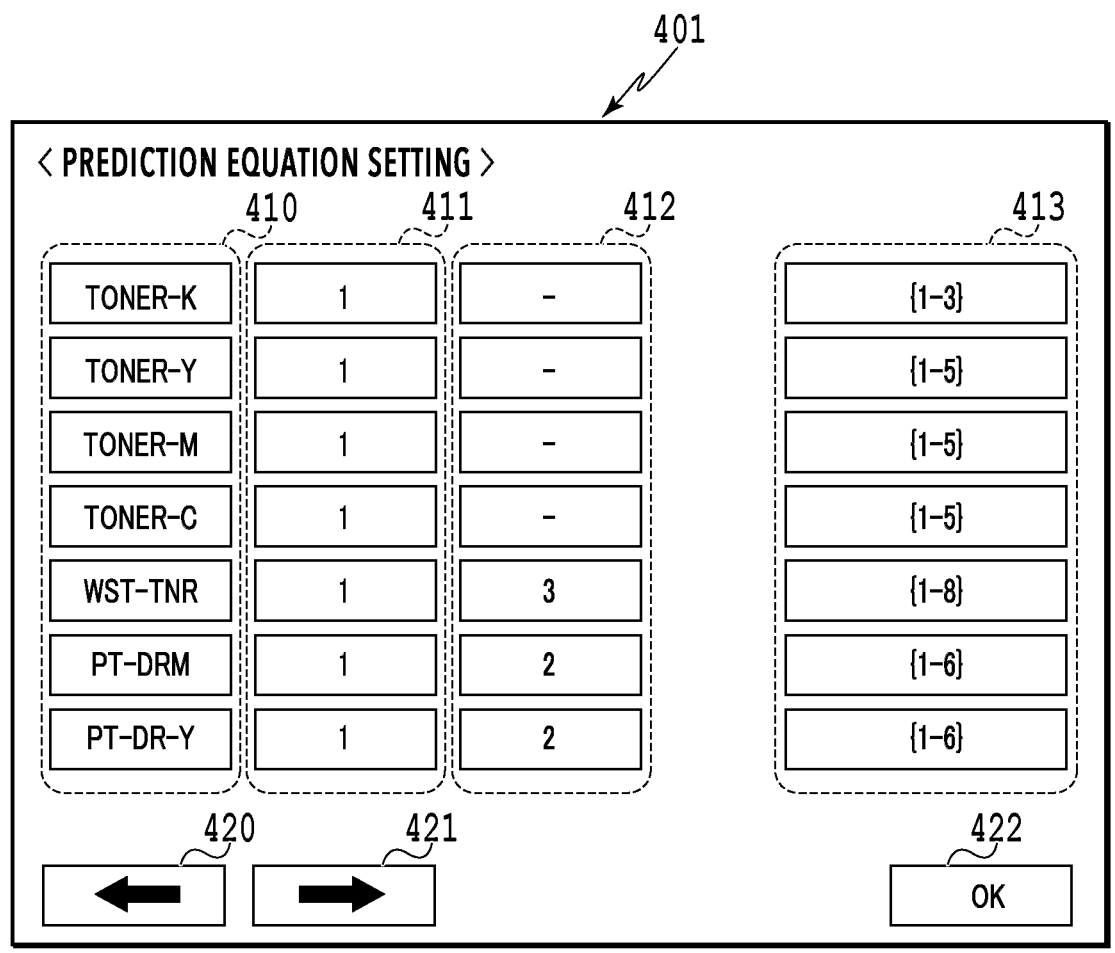
FIG. 4 is a diagram showing an example of a user interface screen for setting a prediction equation.
Figure 5:
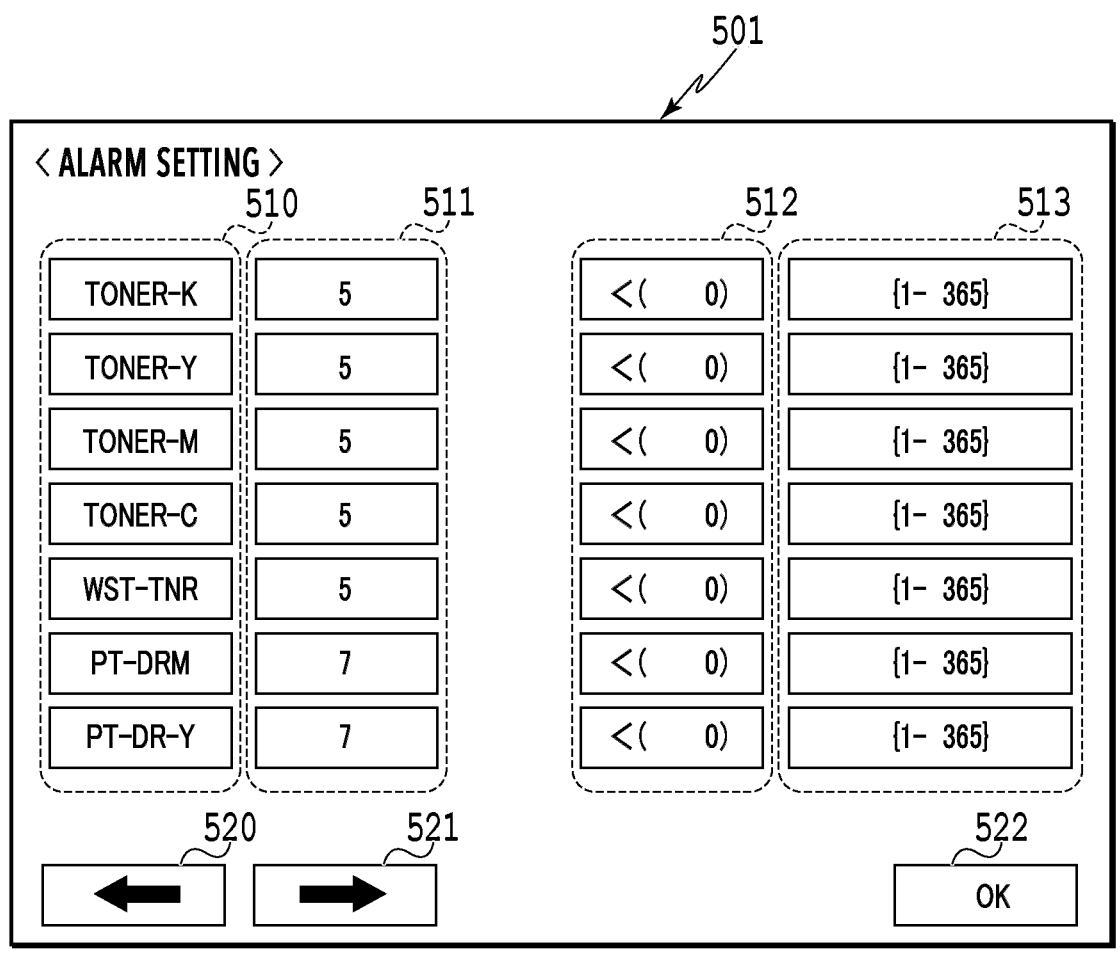
FIG. 5 is a diagram showing an example of a user interface screen for setting a threshold value reach alarm.

Following the above, a user interface (UI) screen for performing setting relating to a maintenance part is explained. FIG. 4 is a diagram showing an example of a UI screen for setting a prediction equation (hereinafter, called prediction equation setting screen). FIG. 5 is a diagram showing an example of a UI screen for setting a threshold value reach alarm (hereinafter, called alarm setting screen). The screens in FIG. 4 and FIG. 5 are displayed on the operation unit 113 based on display data generated by the CPU 101 executing programs stored in the storage 111.

First, by using FIG. 4, the prediction equation setting screen is explained. In the present embodiment, in a case where a prediction equation setting button (not shown schematically) within the situation check/abort screen is pressed down by a user, a prediction equation setting screen 401 is displayed on the operation unit 113 by the CPU 101. The prediction equation setting screen 401 includes areas 410 to 413 and buttons 420 to 422. In the area 410, the maintenance part ID is displayed. The image forming apparatus 100 enumerates the maintenance part ID of each maintenance part registered in the management table 300 in the area 410. In a case where it is not possible to include the maintenance part IDs of all the maintenance parts registered in the management table 300 in the area 410, those maintenance part IDs are divided into a plurality of pages and displayed. The buttons 420 and 421 are buttons for switching display-target pages in a case where the maintenance part IDs are divided into a plurality of pages and displayed. In the area 411, an identifier capable of identifying the prediction equation currently being applied to each maintenance part is displayed. The image forming apparatus 100 refers to the management table 300 and acquires the currently-being-applied prediction equation ID corresponding to each maintenance part, and displays an identifier capable of specifying the acquired currently-being-applied prediction equation ID in the area 411. In the present embodiment, in the area 411, the portion of the figure of the currently-being-applied prediction equation ID is displayed. For example, in the management table 300, as the currently-being-applied prediction equation ID of a maintenance part "TONER-K", "LGC_1_TONER-K" is stored, and therefore, in the first row of the area 411 (row corresponding to maintenance part (TONER-K"), "1" is displayed. In a case where the currently-being-applied prediction equation ID of the maintenance part "TONER-K" is "LGC_2_TONER K", "2" is displayed in the first row of the area 411. "LGC" is an abbreviation of LOGIC. In the area 412, the identifier capable of specifying the reserved prediction equation is displayed. The image forming apparatus 100 refers to the management table 300 and acquires the reserved prediction equation ID corresponding to each maintenance part, and displays the number capable of specifying the acquired reserved prediction equation ID in the area 412. In the present embodiment, in the area 412, the portion of the figure of the reserved prediction equation ID is displayed. For example, in the management table 300, as the reserved prediction equation ID of a maintenance part "WST-TNR", "LGC_3_WST-TNR" is stored, and therefore, in the fifth row of the area 412 (row corresponding to maintenance part "WST-TNR"), "3" is displayed. For the maintenance part whose reserved prediction equation ID is not registered in the management table 300 (maintenance part whose reserved prediction equation ID is "–"), "–" is displayed in the area 412. In the area 413, the range of the prediction equation ID that can be set in the area 412 is displayed. For example, {1-3} in the first row of the area 413 (row corresponding to maintenance part ID "TONER-K") indicates that three prediction equations identified by "LGC_1_TONER-K", "LGC_2_TONER-K", and "LGC_3_TONER-K" are stored. A service engineer or the like selects the row of the change-target maintenance part in the area 412 in a case where it is desired to change the prediction equation of the maintenance part. Then, the selected row enters an input possible state, and therefore, a service engineer or the like inputs the number corresponding to the prediction equation ID that is desired to be switched and presses down the OK button 422. At this time, in a case where the prediction equation corresponding to the input number is a prediction equation that cannot be switched immediately like the prediction equation by the multiple regression analysis or the learning model, the input number is displayed in the area 412 as it is. On the other hand, in a case where the prediction equation corresponding to the input number is a prediction equation that can be switched immediately, the number displayed in the area 411 is overwritten by the input number and "–" is displayed in the area 412. It is assumed that the number is input by a ten-key (not shown schematically) or the like comprised by the operation unit 113. In a case where the value being displayed in the areas 411 and 412 is changed, the image forming apparatus 100 updates Currently-being-applied prediction equation ID 304 and Reserved prediction equation ID 309 in the management table 300 based on the contents after the change.

Next, by using FIG. 5, the alarm setting screen is explained. In the present embodiment, in a case where an alarm setting button (not shown schematically) within the situation check/abort screen is pressed down by a user, an alarm setting screen 501 is displayed on the operation unit 113 by the CPU 101. The alarm setting screen 501 is a screen for setting timing of storing the threshold value reach alarm log for each maintenance part and includes areas 510 to 513 and buttons 520 to 522. In the area 510, the maintenance part ID is displayed. The image forming apparatus 100 enumerates the maintenance part ID of each maintenance part registered in the management table 300 in the area 510. In a case where it is not possible to store the maintenance part IDs of all the maintenance parts registered in the management table 300 in the area 510, those maintenance part IDs are divided into a plurality of pages and displayed. The buttons 520 and 521 are buttons for switching the display-target pages in a case where the maintenance part IDs are divided into a plurality of pages and displayed. In the area 511, the setting value indicating timing of storing the threshold value reach alarm log is displayed. The setting value in the area 511 is reflected in Threshold value reach alarm setting 310 of the management table 300. Then, as described previously, at timing at which the number of remaining days of the maintenance part reaches the value (threshold value) stored in Threshold value reach alarm setting 310, the image forming apparatus 100 stores the threshold value reach alarm log in the RAM 104. In a case of changing the threshold value reach alarm setting of each maintenance part, a service engineer or the like inputs the value after the change in the area 512. In the area 513, the range of the number that can be specified as the threshold value reach alarm setting is displayed. In the example shown in FIG. 5, it is possible to set an arbitrary number in a range between 1 and 365. A service engineer or the like selects the row of the maintenance part whose threshold value reach alarm setting is desired to be changed. Then, the state where it is possible to input a number within the brackets of the selected row is brought about, and therefore, a service engineer or the like inputs one of the numbers within the range displayed in the area 513. For example, in a case where "2" is input, the display of the selected row becomes "<(2)". In a case where the OK button 522 is pressed down in this state, the input number is reflected in the row corresponding to the area 511. In a case where the number in the area 511 is changed in this manner, the image forming apparatus 100 updates Threshold value reach alarm setting 310 of the management table 300.

It may also be possible for the image forming apparatus 100 to send back display information on the UI screens shown in FIG. 4 and FIG. 5 to the maintenance server 10 and a terminal device that is used by a service engineer in response to the request from those apparatus and device. According to the aspect such as this, it is made possible to change the setting (prediction equation setting and alarm setting) of the image forming apparatus 100 remotely via the maintenance server 10 or the like without the need for a service engineer or a person in charge of maintenance to go to the installation position of the image forming apparatus 100.

Figure 6:
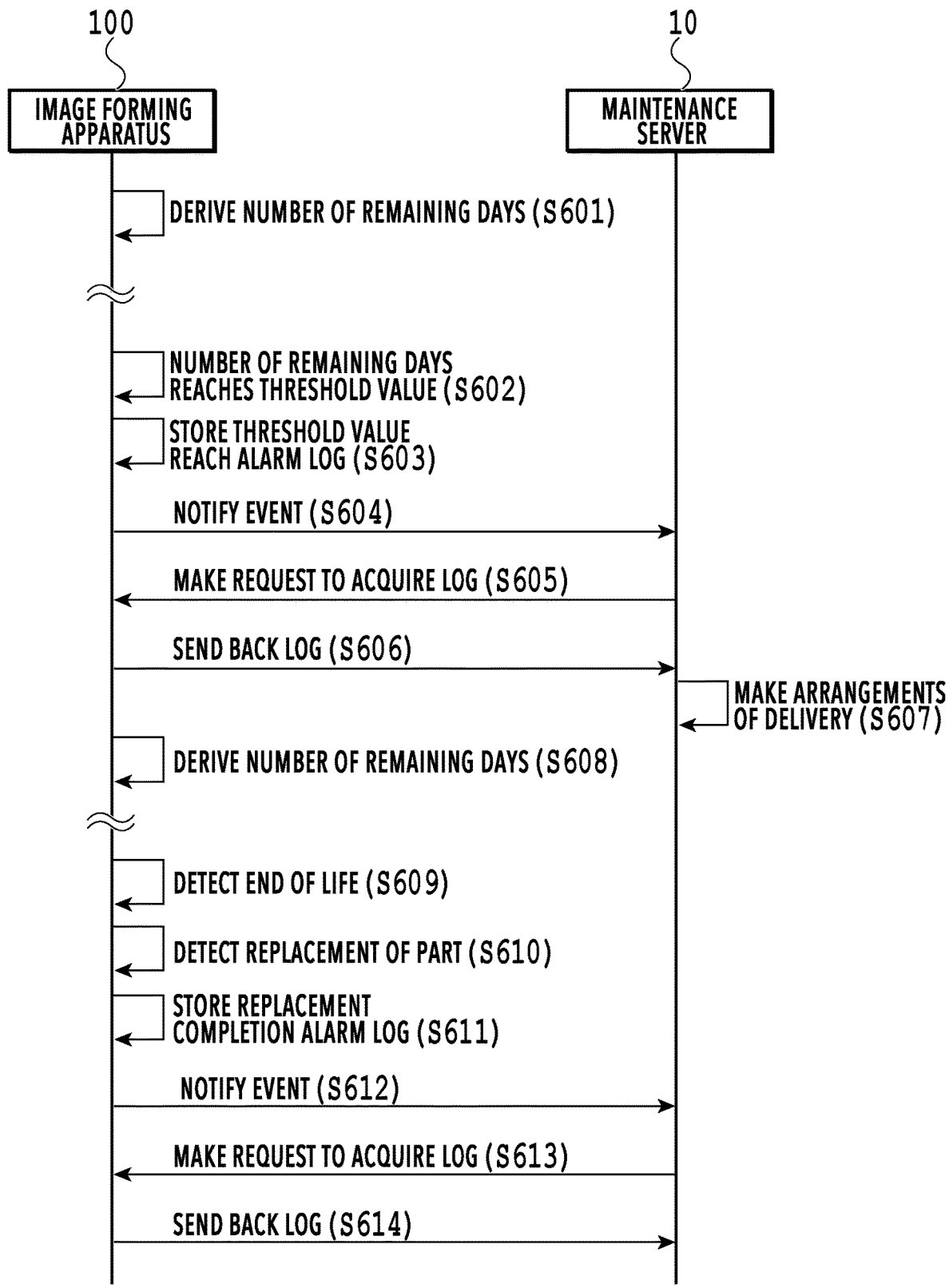
FIG. 6 is a diagram showing an example of a sequence of alarm notification performed between the image forming apparatus and a maintenance server.

Following the above, by using FIG. 6, an alarm notification sequence performed between the image forming apparatus 100 and the maintenance server 10 is explained. The image forming apparatus 100 implements each piece of processing shown in FIG. 6 by the CPU 101 reading a program stored in the ROM 102 or the storage 111 onto the RAM 104 and executing the program. Similarly, the maintenance server 10 implements each piece of processing shown in FIG. 6 by a CPU (not shown schematically) reading a program stored in a storage device (not shown schematically) onto a RAM (not shown schematically) and executing the program within the maintenance server 10. In a case where a plurality of image forming apparatuses is connected to the maintenance server 10, the sequence shown in FIG. 6 is performed between the maintenance server 10 and each image forming apparatus.

The image forming apparatus 100 derives the degree of use and the number of remaining days of each maintenance part and updates the management table 300 based on the derived results (S601). It may also be possible to perform derivation of the degree of use and the number of remaining days regularly or irregularly as described previously. Then, in a case of detecting that the value stored in Number of remaining days 306 of the management table 300 has reached the value set in Threshold value reach alarm setting 310 (S602), the image forming apparatus 100 stores a threshold value reach alarm log in the RAM 104 (S603). Information that is stored as the threshold value reach alarm log will be described later by using FIG. 8. Following the above, the image forming apparatus 100 transmits an event giving a notification that the threshold value reach alarm log is stored to the maintenance server 10 (S604). In this event, an alarm code, to be described later, and an index number for the maintenance server 10 to acquire the threshold value reach alarm log are included. In a case of receiving the event, the maintenance server 10 requests the image forming apparatus 100 to acquire the threshold value reach alarm log by using the index number included in the event as a key (S605). The image forming apparatus 100 sends back the threshold value reach alarm log corresponding to the index number specified by the maintenance server 10 to the maintenance server 10 (S606). Following the above, the maintenance server 10 analyzes the contents of the threshold value reach alarm log acquired from the image forming apparatus 100 and makes arrangements to deliver the necessary maintenance part to the place where the image forming apparatus 100 is installed, adjusts the visit day of a service engineer, and so on (S607).

The image forming apparatus 100 continuously performs derivation of the degree of use and the number of remaining days of each maintenance part (S608). Then, the image forming apparatus 100 soon detects the end of life of the maintenance part (S609). As described above, the end of life of the maintenance part is detected in a case where the value stored in Count value 307 of the management table 300 has reached the value set in Limit count value 308. In a case of receiving the event of the threshold value reach alarm log, the maintenance server 10 makes arrangements so that a new maintenance part arrives at a service engineer or the like before the end of life of the maintenance part is detected. Due to this, it is made possible for an service engineer or the like to perform replacement of the maintenance part without the need to wait for the arrival of a new maintenance part in a case where the maintenance part has reached the end of life. In a case of detecting that the maintenance part has been replaced, (S610), the image forming apparatus 100 stores a replacement completion alarm log in the RAM 104 (S611). Information that is stored as the replacement completion alarm log will be described later by using FIG. 8. Lastly, the image forming apparatus 100 transmits the replacement completion alarm log to the maintenance server 10 (S612 to S614). The processing at S612 to S614 is the same as the processing at S604 to S606, and therefore, explanation is omitted.

Figure 7:
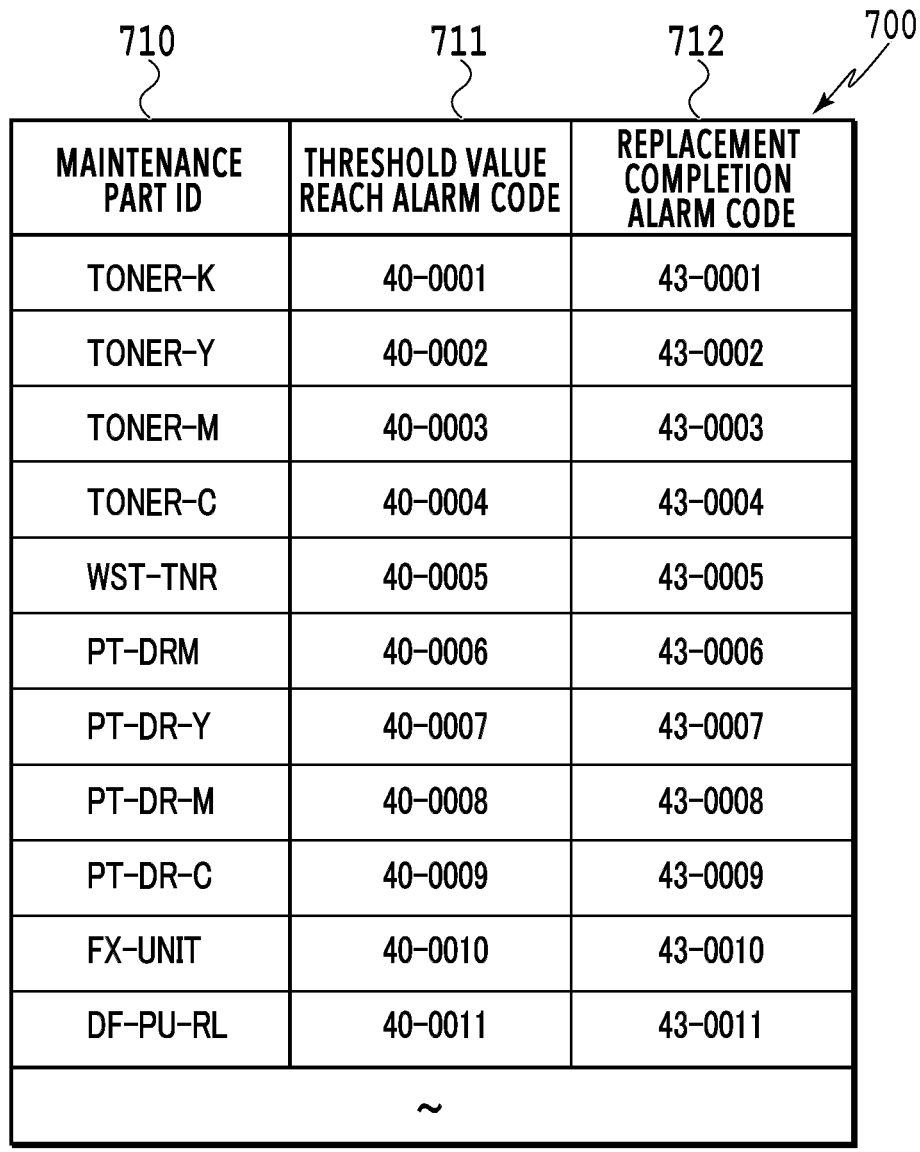
FIG. 7 is a diagram for explaining an alarm code.

Following the above, by using FIG. 7 and FIG. 8, the threshold value reach alarm log and the replacement completion alarm log are explained. FIG. 7 is a diagram for explaining alarm codes. The image forming apparatus 100 stores an alarm code table 700 shown in FIG. 7 in the ROM 102 or the like. Then, the image forming apparatus 100 reads the alarm code table 700 onto the RAM 104 as needed and refers thereto. In the alarm code table 700, in association with Maintenance part ID 710, Threshold value reach alarm code 711 and Replacement completion alarm code 712 are stored. At the time of storing an alarm log at S603 and S611, by including the alarm code shown in FIG. 7 in the alarm log, it is made possible to uniquely specify which alarm of which maintenance part the alarm log stored at S603 and S611 relates to. The first 2-digit number of the alarm code indicates which alarm the alarm code relates to. In the present embodiment, "40" indicates the threshold value reach alarm and "43" indicates the replacement completion alarm. The last 4-digit number of the alarm code indicates which maintenance part the alarm code relates to and as the last 4-digit number, numbers different for different maintenance parts are allocated. For example, in a case where an alarm code "40-0001" is included in the alarm log, the alarm log is identified as the threshold value reach alarm log of "TONER-K". The configuration of the alarm code is not limited to the above-described configuration as long as it is possible to uniquely specify which alarm of which maintenance part. FIG. 8 is a diagram for explaining data included in each alarm log. In the threshold value reach alarm log stored at S603, as shown in FIG. 8, alarm code 801, degree of use 802, number of remaining days 803, and prediction equation ID 804 used for derivation of degree of use 802 and number of remaining days 803 are included. In alarm code 801, Threshold value reach alarm code 711 shown in FIG. 7 is stored. The image forming apparatus 100 collects information 801 to 804 by referring to the management table 300 and the alarm code table 700 at the time of the occurrence of a threshold value reach alarm and stores the collected information in RAM 104 as the threshold value reach alarm log. In the replacement completion alarm log stored at S611, as shown in FIG. 8, alarm code 811, degree of use 812, and prediction equation ID 813 used for derivation of degree of use 812 are included. In alarm code 811, Replacement completion alarm code 712 shown in FIG. 7 is stored. The image forming apparatus 100 refers to the management table 300 and the alarm code table 700 and collects information 811 to 813 and stores the collected information in the RAM 104 as the replacement completion alarm log at the time of the occurrence of a replacement completion alarm. In each alarm log, other data, for example, such as the alarm log storage date, or data indicating information on the date of the previous replacement may be included.

Following the above, a UI screen for presenting the alarm log is explained. In response to the request from a service engineer, the maintenance server 10 performs display control to output display information for presenting the alarm log to a display device (not shown schematically) comprised by the maintenance server 10. It is assumed that the maintenance server 10 has stored the alarm log acquired from the image forming apparatus 100 in the storage device or the RAM in the processing at S606 and S614. FIG. 9 is a diagram showing an example of a UI screen 900 for presenting an alarm log. In an area 901, the image forming apparatus (more specifically, identification information on the image forming apparatus) that is the source of the notification of the event notified at S604 or S612 is displayed. In an area 902, the date of reception of the event notified at S604 or S612 is displayed. In areas 903 to 906, information in accordance with alarms corresponding to the notified events is displayed. Specifically, in a case where the alarm corresponding to the notified event is the threshold value reach alarm, the maintenance server 10 refers to the alarm log acquired at S606 and displays information 801 to 804 in the areas 903 to 906, respectively. Further, in a case where the alarm corresponding to the notified event is the replacement completion alarm, the maintenance server 10 refers to the alarm log acquired at S614 and displays information 811, 812, and 813 in the areas 903, 904, and 906, respectively. A scroll bar 907 is displayed in a case where it is not possible to display all the notified events on the UI screen 900. In a case where a button 908 is pressed down, the UI screen 900 closes. It may also be possible for the maintenance server 10 to send back display information on the UI screen shown in FIG. 9 to the image forming apparatus 100 and a terminal device that is used by a service engineer in response to the request from those apparatus and device.

By the image forming apparatus 100 notifying the maintenance server 10 of the alarm log as described above in accordance with the sequence shown in FIG. 6, it is possible for the maintenance server 10 to acquire not only the degree of use and the number of remaining days of the maintenance part but also the prediction equation used for derivation of the degree of use and the number of remaining days. Further, it is made possible for a service engineer to take measures to doubt a bug of the prediction equation, switch the prediction equation, and so on based on the alarm log information in a case where a deviation has occurred between the predicted degree of use or number of remaining days and the actual degree of wear. That is, it is possible to take appropriate measures in a case where the maintenance part is found in the sufficiently usable state at the time of replacement of the maintenance part in accordance with the predicted number of remaining days or in a case where the end of life of the maintenance part has been reached before the arrival of the maintenance part although arrangements for the maintenance part are made in accordance with the predicted number of remaining days.

Figure 10:
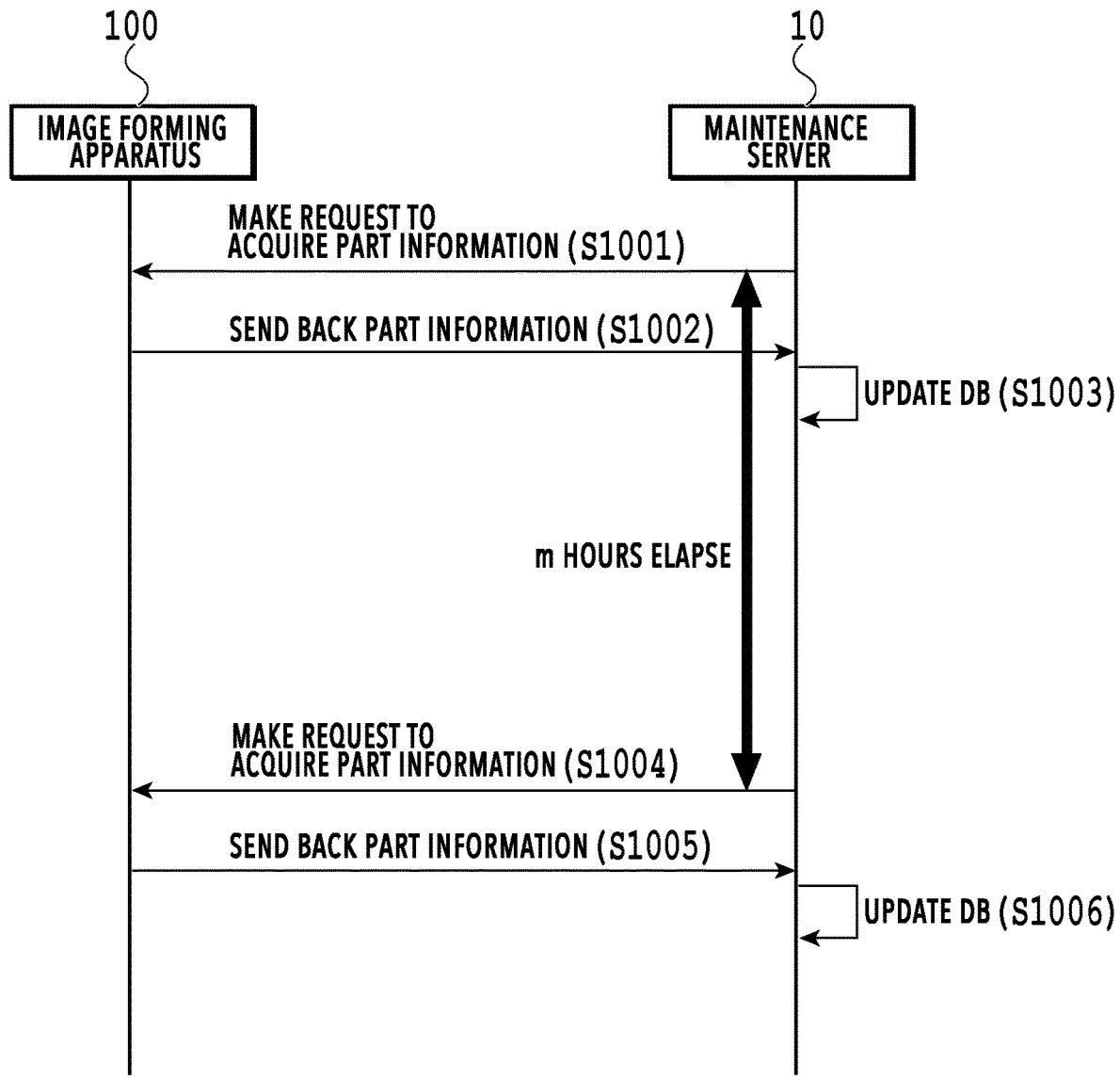
FIG. 10 is a diagram showing an example of a sequence of transmission processing of information relating to a maintenance part, which is performed by the image forming apparatus in response to an acquisition request from the maintenance server.

Following the above, by using FIG. 10, a sequence in which the image forming apparatus 100 sends back information relating to the maintenance part to the maintenance server 10 in response to the acquisition request from the maintenance server 10 is explained. The image forming apparatus 100 implements each piece of processing shown in FIG. 10 by the CPU 101 reading a program for implementing each control module, which is stored in the ROM 102 or the storage 111, onto the RAM 104 and executing the program. Similarly, the maintenance server 10 implements each piece of processing by the CPU reading a program stored in the storage device from the storage device onto the RAM and executing the program within the maintenance server 10.

Figure 11:
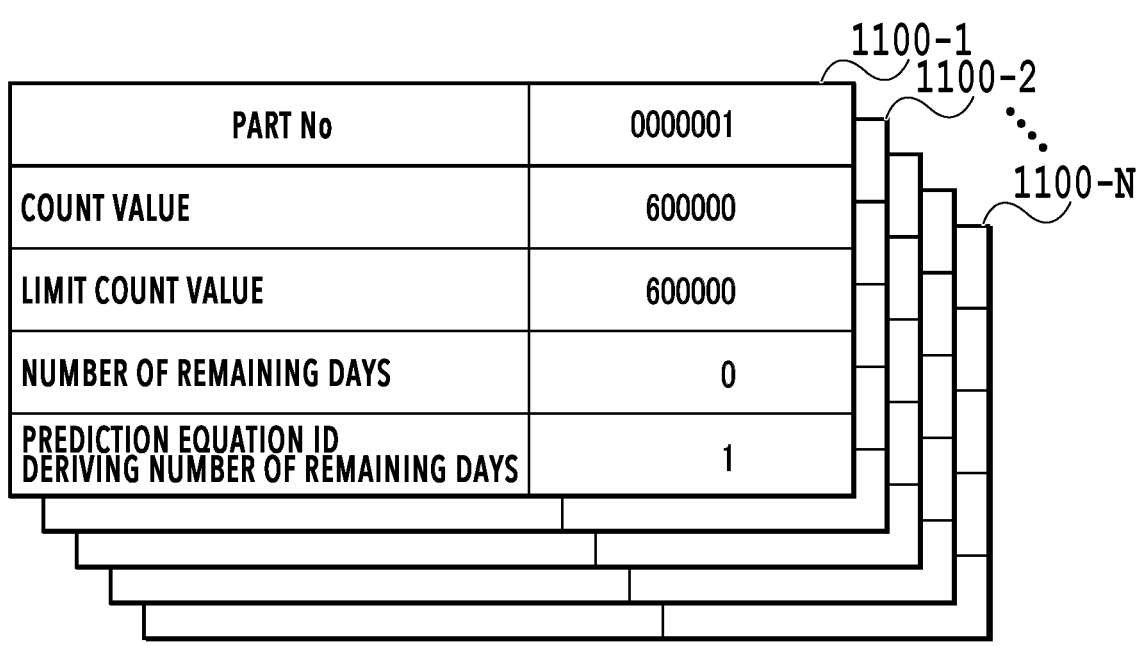
FIG. 11 is a diagram showing an example of part information.

The sequence shown in FIG. 10 is explained. The maintenance server 10 requests the image forming apparatus 100 to acquire part information intermittently (here, each time m hours elapse) in order to update a maintenance part management database (maintenance part management DB) stored in the maintenance server 10 (S1001, S1004). The maintenance part management DB is a database storing part information acquired by the maintenance server 10 from the image forming apparatus 100 for each maintenance part. FIG. 11 is a diagram showing an example of part information. In the present embodiment, part information attributes (Part No Count value, Limit count value, Number of remaining days, and Prediction equation ID deriving Number of remaining days) as shown in FIG. 11 are defined. Part information 1100 (1100-1 to 1100-N) is information storing the value of each part information attribute. Part No corresponds to Maintenance part ID of the management table 300. To Part No, a number capable of uniquely specifying the maintenance part is set. Count value, Limit count value, Number of remaining days, and Prediction equation ID deriving Number of remaining days correspond to Count value, Limit count value, Number of remaining days, and Currently-being-applied prediction equation ID of the management table 300, respectively. The image forming apparatus 100 refers to the management table 300 and collects the value corresponding to each part information attribute. In the part information 1100, another part information attribute may be included. For example, the alarm log storage date, the date of the replacement of the previous time, and the like may be included in the part information.

Upon receipt of the request to acquire part information from the maintenance server 10, the image forming apparatus 100 sends back the part information storing the value of each part information attribute to the maintenance server 10 (S1002, S1005). At this time, it is assumed that the image forming apparatus 100 transmits the part information on all the maintenance parts registered in the management table 300 to the maintenance server 10. That is, in a case where N maintenance parts are registered in the management table 300, part information 1100-1 to 1100-N is transmitted. The maintenance server 10 updates the maintenance part management DB based on the part information received from the image forming apparatus 100 (S1003, S1006).

In a case where a plurality of image forming apparatuses is connected to the maintenance server 10, the sequence shown in FIG. 10 is performed between the maintenance server 10 and each image forming apparatus. Then, the maintenance server 10 stores the maintenance part management DB for each image forming apparatus. Further, the maintenance server 10 outputs display information for presenting the maintenance part management DB to the display device or the like comprised by the maintenance server 10 in response to the request from a service engineer. FIG. 12 is a diagram showing an example of a UI screen 1200 for presenting the maintenance part management DB. In an area 1201, the image forming apparatus (more specifically, identification information on the image forming apparatus) corresponding to the maintenance part management DB being displayed in an area 1202 is displayed. In a case where a dropdown button (▼ button) in the area 1201 is pressed down, a list (pulldown list) of the image forming apparatuses connected to the maintenance server 10 is displayed. In a case where a browse-target image forming apparatus is selected from the dropdown list, the selected image forming apparatus is displayed in the area 1201 and at the same time, it is possible to display the maintenance part management DB of the image forming apparatus in the area 1202. In the example shown in FIG. 12, in the area 1202, the maintenance part management DB of the image forming apparatus 100 is displayed. A scroll bar 1203 is displayed in a case where it is not possible to display information on all the maintenance parts on the UI screen 1200. In a case where a button 1204 is pressed, the UI screen 1200 closes.

It may also be possible for the maintenance server 10 to send back display information on the UI screen shown in FIG. 12 to the image forming apparatus 100 and a terminal device that is used by a service engineer in response to the request from those apparatus and device.

As above, in the present embodiment, the maintenance server 10 acquires the part information for each predetermined period and updates the maintenance part management DB of the maintenance server 10. Further, in the present embodiment, the maintenance part management DB is presented to a service engineer or the like via the UI screen shown in FIG. 12. Due to this, it is made possible for a service engineer or the like to regularly check the life of the maintenance part of each image forming apparatus connected to the maintenance server 10. Further, the prediction equation ID deriving the number of remaining days of the maintenance part is included in the part information, and therefore, it is possible for a service engineer or the like to easily specify the image forming apparatus whose prediction equation should be updated in a case where the version of the prediction equation is upgraded or in a case where a bug is found in the prediction equation. Consequently, it is made possible to perform maintenance of the image forming apparatus both appropriately and easily.

In the present embodiment, the example is explained in which the alarm log and the maintenance part management DB are displayed on the display device comprised by the maintenance server 10. Note that it may also be possible to present the alarm log and the maintenance part management DB by another method. For example, it may also be possible for the maintenance server 10 to present the alarm log and the maintenance part management DB to a user by printing their information. Further, it may also be possible for the maintenance server 10 to present the alarm log and the maintenance part management DB to a user by transmitting their information to a terminal device that is used by a service engineer by a mail or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, in a system that manages a maintenance part that needs replacement accompanying the operation of an image forming apparatus, it is possible to easily specify a prediction equation used for a prediction of the life of a maintenance part. Due to this, it is made possible to appropriately manage the maintenance part.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-232660, filed Dec. 12, 2018, which is hereby incorporated by reference wherein in its entirety.

What is claimed is:

1. An apparatus capable of attaching a maintenance part that needs replacement accompanying use, the apparatus comprising:
  a storage unit configured to store at least one or more patterns of a prediction equation for predicting a life of the maintenance part in a storage device;
  a prediction unit configured to predict a life of the maintenance part by applying one of prediction equations stored in the storage unit; and
  a transmission unit configured to transmit predetermined information relating to the maintenance part to a management apparatus that manages information relating to a life of the maintenance part, wherein
  the transmission unit includes identification information on a prediction equation currently being applied to a prediction of a life of the maintenance part in the predetermined information that is transmitted to the management apparatus.

2. The apparatus according to claim 1 further comprising:
  an estimation unit configured to estimate a remaining time until an end of life predicted for the maintenance part is reached, wherein
  in the predetermined information, log information on a first alarm is included, which is transmitted to the management apparatus in a case where the first alarm indicating that the remaining time estimated for the maintenance part has reached a predetermined threshold value occurs and
  the transmission unit includes information indicating the remaining time estimated for the maintenance part and identification information on a prediction equation currently being applied to a prediction of a life of the maintenance part in the log information on the first alarm.

3. The apparatus according to claim 2, wherein
  in the predetermined information, log information on a second alarm is included as the predetermined information, which is transmitted to the management apparatus in a case where the second alarm indicating that replacement completion of the maintenance part is detected occurs and
  the transmission unit includes information indicating the remaining time estimated for the maintenance part and identification information on a prediction equation that is applied to the maintenance part after replacement of the maintenance part is completed in the log information on the second alarm.

4. The apparatus according to claim 3, wherein
  the transmission unit further includes information capable of specifying the maintenance part in the log information on the first alarm and the log information on the second alarm.

5. The apparatus according to claim 3, further comprising:
  a notification unit configured to notify the management apparatus of an event in a case where either alarm of the first alarm and the second alarm occurs, wherein
  the transmission unit transmits the log information on the alarm that has occurred to the management apparatus upon receipt of a first acquisition request that is made by the management apparatus in response to reception of the event.

6. The apparatus according to claim 3, wherein
  the storage unit stores a prediction equation in one or more patterns for each of a plurality of the maintenance parts whose kinds are different,
  the estimation unit estimates the remaining time for each maintenance part, and
  the transmission unit:
    transmits the log information on the first alarm to the management apparatus for each of the maintenance parts in response to the first alarm that occurs for each of the maintenance parts based the remaining time estimated for each of the maintenance parts and the predetermined threshold value that is set in advance for each of the maintenance parts; and
    further transmits the log information on the second alarm to the management apparatus for each of the maintenance parts in response to the second alarm that occurs for each of the maintenance parts.

7. The apparatus according to claim 2, wherein
  the transmission unit transmits part information to the management apparatus, which is information relating to the maintenance part, in response to a second acquisition request from the management apparatus and
  in the part information, identification information on a prediction equation currently being applied to a prediction of a life of the maintenance part is included along with information indicating the remaining time estimated for the maintenance part.

8. The apparatus according to claim 7, wherein
in the part information, information capable of specifying the maintenance part, a value obtained by counting the number of times of use of the maintenance part, and a limit count value indicating the number of times of use by which the maintenance part reaches an end of life are further included.

9. The apparatus according to claim 1, wherein
the apparatus is an image forming apparatus that forms an image on a printing medium by using a color material.

10. The apparatus according to claim 9, wherein
in the maintenance part, at least one of a photoconductor drum, a toner container, a fixing unit, a collected toner container, and a document feed roller is included.

11. A control method in a management apparatus that manages information relating to a life of a maintenance part that can be attached to an apparatus, which needs replacement accompanying an operation of the apparatus, the method comprising:
   a reception step of receiving predetermined information relating to the maintenance part from the apparatus; and
   a presentation step of presenting the received predetermined information to a user, wherein
   in the predetermined information, identification information on a prediction equation applied in a case where the apparatus predicts a life of the maintenance part is included.

12. The control method according to claim 11, wherein
the presentation step presents the predetermined information to a user by displaying the predetermined information on a display device.

13. The control method according to claim 11, wherein
the reception step receives, as the predetermined information, log information on a first alarm that occurs in a case where a remaining time until an end of life of the maintenance part predicted by the apparatus is reached reaches a predetermined threshold value and
in the log information on the first alarm, information indicating the remaining time and identification information on a prediction equation currently being applied to a prediction of a life of the maintenance part are included.

14. The control method according to claim 13, wherein
the reception step receives, as the predetermined information, log information on a second alarm that occurs in a case where the apparatus detects completion of replacement of the maintenance part and
in the log information on the second alarm, information indicating the remaining time and identification information on a prediction equation that is applied to the maintenance part after replacement of the maintenance part is completed are included.

15. The control method according to claim 14, wherein
in the log information on the first alarm and the log information on the second alarm, information capable of specifying the maintenance part is included.

16. The control method according to claim 14, wherein
the reception step receives the log information on the first alarm and the log information on the second alarm for each of a plurality of the maintenance parts whose kinds are different and
the presentation step presents the log information on the first alarm and the log information on the second alarm, which are received for each maintenance part, to a user.

17. The control method according to claim 11, further comprising:
   a request step configured to transmit a request to acquire part information, which is information relating to the maintenance part, to the apparatus, wherein
   the reception step receives, as the predetermined information, the part information that the apparatus transmits in response to the acquisition request and
   in the part information, information capable of specifying a prediction equation currently being applied to a prediction of a life of the maintenance part is included along with information capable of specifying the maintenance part.

18. The control method according to claim 17, wherein
in the part information, information indicating a remaining time until an end of life of the maintenance part predicted by the apparatus is reached, a value obtained by counting the number of times of use of the maintenance part, and a limit count value indicating the number of times of use by which the maintenance part reaches an end of life are included.

19. The control method according to claim 11, wherein
in the maintenance part, at least one of a photoconductor drum, a toner container, a fixing unit, a collected toner container, and a document feed roller is included.

20. A control method in an apparatus capable of attaching a maintenance part that needs replacement accompanying use, the method comprising:
   a prediction step of predicting a life of the maintenance part by applying one of prediction equations in at least one or more patterns for predicting a life of the maintenance part; and
   a transmission step of transmitting predetermined information relating to the maintenance part to a management apparatus that manages information relating to a life of the maintenance part, wherein
   at the transmission step, identification information on a prediction equation currently being applied to a prediction of a life of the maintenance part is included in the predetermined information that is transmitted to the management apparatus.

* * * * *